United States Patent [19]

Cook

[11] 3,783,992

[45] Jan. 8, 1974

[54] APPARATUS FOR POSITIONING ARTICLES

[75] Inventor: Charles W. Cook, Muncie, Ind.

[73] Assignee: Ball Corporation, Muncie, Ind.

[22] Filed: Sept. 2, 1971

[21] Appl. No.: 177,236

[52] U.S. Cl............................ 198/33 AB, 214/1 BC
[51] Int. Cl............................................. B65g 47/24
[58] Field of Search............ 198/22 R, 22 B, 33 AB, 198/104; 214/1 BC

[56] References Cited
UNITED STATES PATENTS

| | | | |
|---|---|---|---|
| 2,349,638 | 5/1944 | Schreiber........................... | 198/25 X |
| 2,888,131 | 5/1959 | Allen.................................. | 198/25 X |
| 2,829,757 | 4/1958 | Breeback........................... | 198/104 X |
| 2,528,912 | 11/1950 | Rappaport........................ | 198/33 AB |
| 3,100,051 | 8/1963 | Schreiber........................... | 198/33 AD X |

*Primary Examiner*—Edward A. Sroka
*Attorney*—Gilbert E. Alberding

[57] ABSTRACT

Apparatus for rapidly and accurately positioning articles, said apparatus being particularly well suited for positioning glassware for inspection purposes and includes a plurality of paired arms both of said arms in each pair being movable substantially equal distances between open and closed positions for sequentially engaging articles and positioning the same. Input and discharge screws are included to deliver and remove articles in timed relationship to the opening and closing movement of said arms and the movement of said articles along a predetermined path while engaged by said arms.

10 Claims, 3 Drawing Figures

PATENTED JAN 8 1974

INVENTOR
CHARLES W. COOK
BY
Robert E. Harris
ATTORNEY

INVENTOR
CHARLES W. COOK
BY
Robert E. Harris
ATTORNEY

APPARATUS FOR POSITIONING ARTICLES

BACKGROUND OF THE INVENTION

1. Field of the Invention

This invention relates to apparatus for accurately positioning articles and, more particularly, relates to apparatus for accurately positioning glassware for inspection purposes.

2. Discussion of the Prior Art

Accurate positioning of articles has often times been found necessary to achieve a desired end, particularly when high handling speeds are encountered. Such as been the case, for example, in handling glassware and inspecting the same.

It is well-known in the glassware manufacturing industry to subject newly manufactured glassware to a number of quality checks and tests. Such well-known tests are directed towards, for instance, the discovery of glass article imperfections such as dimension abnormalities, splits, checks, seeds or the like. While at slower speeds, these tests could be carried on visually; it has been found that inspection machines have proved useful and, as speeds have increased, have, in many cases, been essential in maintaining quality of product. Since a number of independent tests are usually required to maintain the high quality of acceptable glassware, it is now conventional to provide an apparatus wherein a number of inspection stations are employed and the glassware is sequentially advanced from station-to-station with one or more tests being conducted at each station. Apparatus of this nature is described, for example, in U.S. Pat. No. 3,245,529, issued Apr. 12, 1966, to Wilbur O. Doud.

For meaningful inspection of glass articles, the articles must, of course, be positioned, or maintained, in an accurate relationship with respect to the inspection apparatus. For example, if a light beam is being utilized for inspecting the finish of the article, the inspection apparatus normally includes a photocell for receiving light and this photocell is positioned in a predetermined position to receive the light beam, which may be, for example, at an angle so as to receive reflected light from the finish, the receipt of which can indicate an imperfection in the article (or an indication that no imperfection is present if the apparatus operates in this manner). As can be appreciated, such inspection apparatus is desirably retained in fixed position once set up.

Thus, it is important that positioning of the articles be as accurate as possible since poor positioning can adversely affect inpsection. While prior art devices have provided suitable positioning of articles for some purposes, these devices have not been completely successful for all purposes due, at least in part, to higher speeds required and/or the ability of rapid adaption to handling articles of varying dimensions.

Previously, for example, positioning of articles has been achieved by means of indexing arms, one of which was fixed during operation with respect to a transport wheel and, thus, accuracy of center positioning was restricted to receiving glassware of the same dimensions. Receiving different glassware required temporary line shutdown for adjusting the indexing arms, which, of course, adversely affects production results.

SUMMARY OF THE INVENTION

This invention provides an improved apparatus for accurately positioning articles that is particularly well suited for rapidly and accurately positioning glassware and, thus, promotes quality inspection of the same. This end is achieved by providing means for moving both arms of a pair of arms in a predetermined manner to achieve accurate positioning of articles maneuvered by the arms. Since the arms are both movable, articles of varying dimensions can be handled and still be maintained in proper position as, for example, for inspection purposes.

Accordingly, it is an object of this invention to provide an improved device for accurate positioning of articles.

It is another object of this invention to provide an improved device suitable for accurately positioning glass articles for inspection purposes.

It is still another object of this invention to provide an improved device for accurately inspecting articles that includes dually movable arms for engaging articles and rapidly and accurately positioning the same.

It is another object of this invention to provide an improved apparatus for properly positioning glass articles at one or more inspection stations.

It is yet another object of this invention to provide an improved device for accurately positioning articles that is suitable for use with articles of varying dimensions.

These and other objects and advantages of the present invention will become apparent to those skilled in the art from a consideration of the following detailed description and drawings.

BRIEF DESCRIPTION OF THE DRAWINGS

The accompanying drawings illustrate a complete embodiment of the invention in which.

DETAILED DESCRIPTION OF THE PREFERRED EMBODIMENT

Figure 1:
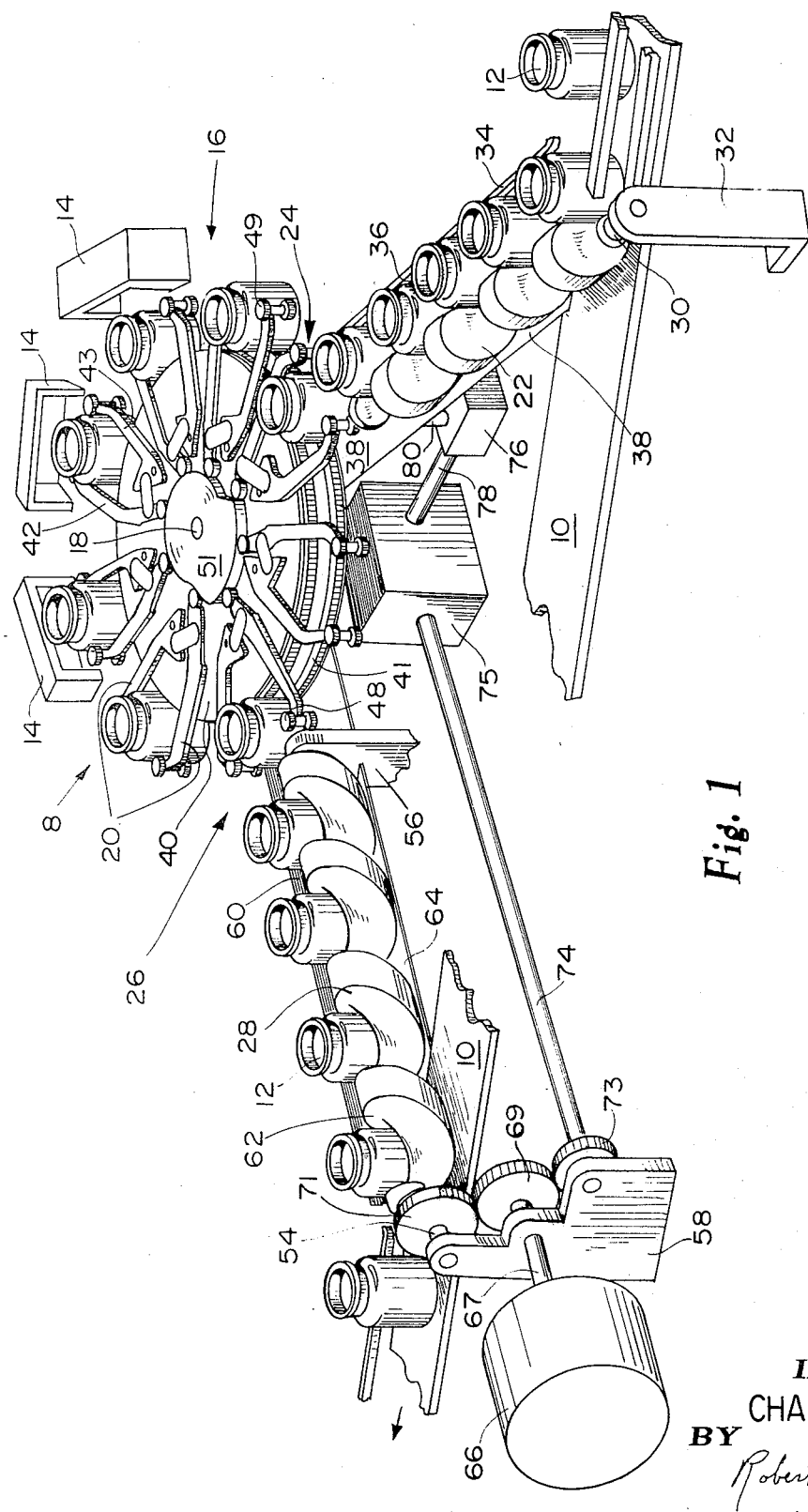
FIG. 1 is a perspective cut-away view of the apparatus generally provided for positioning glassware.

Referring now to the drawings in which like numerals are used for like components, the apparatus for positioning glassware is designated by the numeral 8. As shown in FIG. 1, a conventional endless conveyor 10 is provided to direct glassware 12 to intercepting glassware positioning apparatus 8. Apparatus 8 which can be used, for example, in conjunction with known inspection apparatus having a plurality of stations (illustrated for simplicity as blocks 14), has a transport wheel 16 mounted on a shaft 18 so as to be freely rotatable with respect thereto with a plurality of paired movable arms generally designated by the numeral 20 pivotally attached for receiving and positioning glassware 12 received from infeed screw 22, said paired arms 20 engaging and positioning glassware 12 at a receiving station 24. Thereafter, glassware 12 is carried along an angular path defined by the rotation of the transport wheel 16 that presents the glassware to each inspection apparatus 14 and then delivers the glassware 12 to a discharge station 26 for removal by discharge screw 28 and return of glassware 12 to conveyor 10 (or to a separate conveyor if desired).

The infeed screw 22 is situated above conveyor 10 and extends thereover at an angle with respect thereto so that glassware 12 contacts the infeed screw 22 as the glassware 12 is moved along the conveyor 10. The infeed screw 22 is rotatable on a shaft 30, said shaft being journeyed for rotation in support 32 at one end which can be fixedly attached in a housing (not shown) and said infeed screw 22 is further journeyed at the other end in a second support (not shown). A guide 34 is situated substantially parallel to and spaced apart from the infeed screw 22, said guide 34 extending lengthwise from the inner edge of the conveyor 10 so as not to intersect the same to said receiving station 24, said guide 34 and infeed screw 22 defining a channel 36. A floor 38 covers the bottom area of said channel 36 and supports glassware moving through said channel so that glassware 12 intercepted by said infeed screw 22 from said conveyor 10 is moved along said channel 36 to said receiving station 24 by the rotation of said infeed screw 22.

The transport wheel 16 is situated adjacent to said infeed screw 22 and combines with said infeed screw 22 and channel 36 to form said receiving station 24. The transport wheel 16 is mounted on shaft 18 so as to be freely rotatable with respect thereto. The transport wheel 16 consists of an upper rotatable disc 40 and a lower and separately rotatable disc 41. The upper rotatable disc 40 has a plurality of paired movable arms 20 pivotally attached thereto for engaging and positioning glassware at said receiving station 24 wherein the rotation of the upper rotatable disc 40 moves the glassware 12 so engaged along a predetermined angular path in a sequential manner before each of the plurality of inspection apparatus 14 for inspection. Glassware 12 is engaged at the receiving station 24 by paired movable arms 20 and the lower disc 41 whereupon as the glassware reaches each inspection apparatus for inspection, the lower separately rotatable disc 41 is rapidly rotated to impart a high-speed rotation to the glassware while before the inspection apparatus 14.

Figure 2:
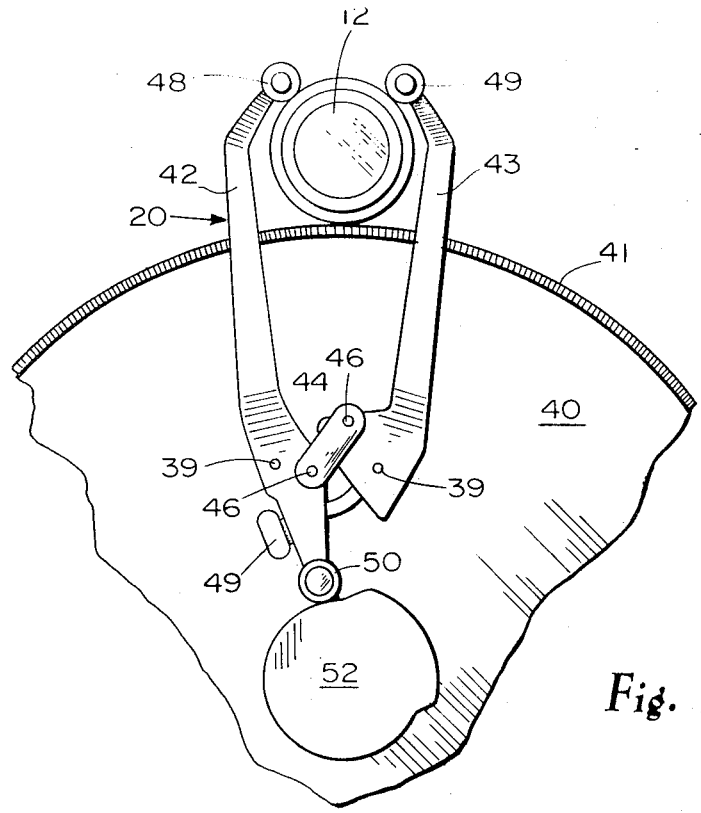
FIG. 2 is a top view of the movable arms as positioned on transport wheel immediately after receiving the glassware.

As best shown in FIG. 2, the paired movable arms 20 consist of a first arm 42 and a second arm 43. Both arms 42 and 43 are movable and are pivotally attached at points 39 to the upper disc 40 of the transport wheel 16 for movement between open and closed positions for engaging and releasing glassware 12 at the appropriate times. First arm 42 and second arm 43 are linked together by a linkage 44 at pivot points 46 to provide for simultaneous movement of each said first and second arm. First arm 42 and second arm 43 have a roller portion 48 and 49 at one end thereon for engaging glassware 12 in combination with the lower disc 41 for causing the glassware 12 to be freely rotatable while engaged by the paired movable arms 20 and lower disc 41. A stop 49 can be used to provide for a maximum closed position for the paired movable arm 20. At the other end of the first arm 42 is a cam follower 50 which rests against the cam path 51 of cam 52. The cam 52 is fixedly mounted on shaft 18 and preprogrammed so that as the upper disc rotates, the paired movable arms 20 move about the circumference of the upper disc 40, the arms 20 sequentially move from an open to a closed position at the receiving station 24 for engaging and positioning glassware 12 and from a closed to an open position at the discharge station 26 to remove glassware as described hereinafter.

A discharge screw 28 is positioned adjacent transport wheel 16 and is mounted abve the conveyor 10 and at an angle with respect thereto. Both ends of discharge screw 28 are rotatably mounted by shaft 54 in a support 56 adjacent the transport wheel 16 and a second support 58 at the outside of conveyor 10. A guide 60 is spaced apart and runs substantially parallel with the discharge screw 28. The guide at one end is adjacent to the transport wheel and at the other end meets, but does not intersect, the conveyor 10. The discharge screw 28 and guide 60 form a channel 62 which said channel has a floor 64. The channel 62 at the end adjacent the transport wheel 16 combines with the transport wheel 16 to form the discharge station 26. Thus, as glassware is sequentially transferred to said discharge station 26, the glassware is released by paired movable arms 20 and moved along said channel 62 by the rotation of the discharge screw 28 and returned to conveyor 10.

The apparatus for positioning glassware 8 is operable in a timed relationship so that the infeed screw 22, the transport wheel 16 with upper and lower discs 40 and 41, paired movable arms 20 and discharge screw 28 are all movable in a timed relationship with respect to each other to provide for rapid delivery, engagement, inspection and removal of glassware. A conventional motor 66 is connected by a shaft 67 to a drive gear 69 which said shaft 67 is mounted through the support 58. The drive gear 69 is engageable with a second drive gear 71 which said second drive gear 71 is mounted on the shaft 54 of discharge screw 28 in support 58 so that as the motor rotates the drive gear 69, discharge screw 28 is caused to rotate. The drive gear 69 is also engaged with a second gear 73 which is mounted on a rotatable shaft 74 which said shaft 74 is also journeyed in support 58 at one end and a conventional gear assembly shown as block 75. The gear assembly 75 is conventionally connected (not shown) with upper and lower disc 40 and 41 of the transport wheel 28 for causing the rotational movement of each disc. The gear assembly 75 is engageable with a second conventional gear assembly represented by block 76 by a rotatable shaft 78, block 76 being connectable with the infeed screw 22 by a rotatable shaft 80 for rotation of the infeed screw 22. Thus, a motor 66 operates, drive gear 69 rotates the infeed screw 22 to deliver glassware 12 to the receiving station. Simultaneously, upper disc 40 rotates to bring the paired movable arms sequentially into position at the receiving station 24 for engaging glassware 12. The upper disc 40 is then further rotated to sequentially move the glassware 12 along an angular predetermined path to present the glassware 12 before the inspection stations 14 whereupon the lower disc 41 rapidly rotates to subject the glassware 12 to high-speed spinning for inspection. Thereafter, the glassware 12 is moved to discharge station 26 whereupon glassware 12 is removed by the rotation of the discharge screw 28 returning glassware 12 to conveyor 10.

Figure 3:
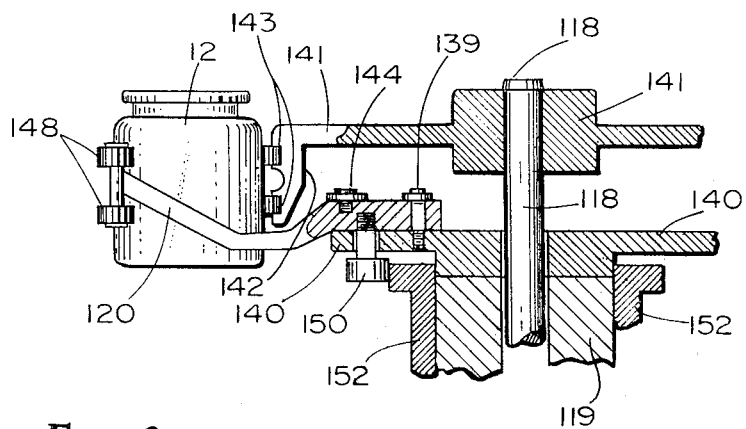
FIG. 3 is a cut-away partial side view of a second embodiment of this invention showing the movable arms in relation to the transport wheel.

A second embodiment of this invention can be used as illustrated in FIG. 3 which shows glassware 12 as engaged and positioned in arms 120, the glassware 12 being engaged by roller 148 attached to arms 120. Arms 120 are pivotally attached at pivot point 139 to a lower rotatable disc 140 and linked together by linkage 144, the arms being curved in a generally U-shaped configuration, as viewed in FIG. 3, so as to extend under and beyond the downwardly flared peripheral flange portion 142 of upper rotatable disc 141. The glassware 12 is rapidly rotated by engagement with flange portion 142 of upper rotatable disc 141, said engagement of the glassware being preferably by contact with resilient outwardly extending portion 143 on flange 142 to protect the ware. Upper and lower rotatable discs 141 and 140 are mounted on concentric shafts 118 and 119, respectively, with shafts 118 and 119 being connected to the drive means in conventional flash to drive the discs and achieve the necessary rotation to spin the glassware 12 (disc 141) and to move the glassware 12 along a predetermined path (disc 140) as explained more fully hereinabove. A cam 152 is fixedly positioned below lower rotatable disc 140 and about shaft 119. A cam follower 150 is fixedly attached to arms 120 and remain in contact with cam 152 so that as lower disc 140 rotates, the arms 120 are moved between the open and closed positions in the same manner as explained hereinabove for FIGS. 1 and 2.

In operation, glassware 12 is continuously intercepted from conveyor 10 by infeed screw 22 which delivers the glassware 12 to a receiving station 24. The glassware is sequentially engaged and positioned by paired movable arms 20 as the transport wheel 16 rotates. The glassware 12 is sequentially moved along an angular predetermined path for inspection at each of the inspection apparatus 14, and thereafter the glassware 12 is moved to the discharge station 26 whereupon the glassware 12 is sequentially released and moved along channel 62 by the rotation of discharge screw 28 for return to conveyor 10.

Modifications and alternatives of the above-described invention will be apparent to those skilled in the art which said modifications and alternatives are included as being within the scope of this invention since the invention is not intended to be limited by the specific apparatus described and shown in detail except as required by the following claims.

I claim:

1. Apparatus for positioning articles comprising: first and second movable means adapted to engage said articles to be positioned, said first and second movable means including a pair of arms movable toward and away from one another for grasping articles therebetween; rotary means providing lateral support for said articles actuating means for causing said first and second means to be moved in a predetermined manner for engaging articles to position the same and for causing movement of said article along a predetermined path while retaining said position; and means to impart rotation to said articles during at least a portion of said predetermined path.

2. Apparatus of claim 1 wherein said pair of arms are simultaneously movable to affect said grasping of said articles therebetween.

3. Apparatus of claim 2 wherein said actuating means includes linkage means for causing movement of both of said arms.

4. Apparatus of claim 3 wherein said actuating means also causes movement of said article prepositioned within said pair of arms and of said linkage means along said predetermined path.

5. Apparatus of claim 4 wherein said linkage means is caused to simultaneously move both of said arms under the influence of a drive means.

6. Apparatus for positioning glassware, comprising: first and second arms movable between open and closed positions, a portion of each of which includes a roller adapted to engage and secure glassware against a rotatable disc; linkage means for causing both of said arms to be moved between said open and closed positions; first actuating means connected with said linkage means for causing said linkage means to move said first and second arms between said open and closed positions; second actuating means for moving said glassware along a predetermined path while said first actuating means maintains said first and second arms in said closed position with said rollers against said glassware, whereby the glassware is rotated by said disc during at least a portion of the movement along said predetermined path.

7. Apparatus of claim 6 further including input means for directing glassware to a receiving station wherein said glassware is engaged by said first and second arms, discharge means for moving glassware after said glassware has moved along said predetermined path, and timing means connected with said actuating means and said input means and discharge means for causing said glassware to be delivered to said receiving station and removed by said discharge means as said arms are moved from said open to said closed position at said receiving station and from said closed to said open position at said discharge means.

8. Apparatus of claim 6 wherein said linkage means causes simultaneous movement of said first and second arms for substantially equal distance between said open and closed positions.

9. Apparatus for positioning and rotating glassware, comprising: input means for directing glassware to a receiving station; first and second arms having rollers positioned thereon movable between an open and closed position and adapted to engage said rollers against said glassware at said receiving station by moving from said open to said closed position; a curved surface against which said glassware is secured by said arms; linkage means between said first and second arms for causing both of said arms to be moved simultaneously and substantially equal distances between said open and closed positions; first actuating means connected with said linkage means for causing said linkage means to move both said first and second arms between said open and closed position; second actuating means for moving said glassware along a predetermined path from said receiving station to a discharge station while rotating said glassware against said curved surface as said first actuating means maintains said first and second arms in said closed position in engagement with said glassware; discharge means for removing said glassware from said discharge station after said glassware has moved along siad predetermined path and said first actuating means has caused said first and second arms to be moved from said closed to said open position; and timing means connected with said actuating means and said input means and discharge means for causing said glassware to be delivered to said receiving station as said first and second arms are moved from said open to said closed position to engage said glassware at said receiving station and for causing said glassware to be removed at said discharge station after said glassware has been moved along siad predetermined path by said second actuating means with said first and second arms being moved from said closed to said open position at said discharge station.

10. Apparatus for positioning glassware, comprising: first and second arms adapted to move simultaneously for engaging glassware therebetween; actuating means including linkage means between said first and second arms for effecting said simultaneous movement of said first and second arms for substantially equal distances between open and closed positions for center positioning of said glassware, rollers positioned on said arms to bear against said glassware and a curved surface against which said arms urge said glassware.

* * * * *